(12) United States Patent
Walker et al.

(10) Patent No.: US 7,900,751 B2
(45) Date of Patent: Mar. 8, 2011

(54) METHOD AND BRAKE DISC ASSEMBLY TO UTILIZE WORN REFURBISHED BRAKE MATERIAL

(75) Inventors: Terence B. Walker, South Bend, IN (US); Akshay Waghray, Granger, IN (US)

(73) Assignee: Honeywell International Inc., Morristown, NJ (US)

( * ) Notice: Subject to any disclaimer, the term of this patent is extended or adjusted under 35 U.S.C. 154(b) by 328 days.

(21) Appl. No.: 11/345,468

(22) Filed: Feb. 1, 2006

(65) Prior Publication Data

US 2007/0175710 A1 Aug. 2, 2007

(51) Int. Cl.
*F16D 55/36* (2006.01)

(52) U.S. Cl. ...................... 188/71.5; 188/71.7

(58) Field of Classification Search ........... 188/71.5, 188/71.7, 73.1, 79.51, 218 XL; 29/402.06
See application file for complete search history.

(56) References Cited

U.S. PATENT DOCUMENTS

| | | | |
|---|---|---|---|
| 3,712,427 A | 1/1973 | Cook et al. | |
| 3,956,548 A | 5/1976 | Kovac et al. | |
| 4,613,017 A | 9/1986 | Bok et al. | |
| 4,742,895 A * | 5/1988 | Bok | 188/71.7 |
| 4,977,985 A | 12/1990 | Wells et al. | |
| 4,982,818 A | 1/1991 | Pigford | |
| 5,099,960 A * | 3/1992 | Alev | 188/73.1 |
| 5,143,184 A * | 9/1992 | Snyder et al. | 188/218 XL |
| 5,295,560 A * | 3/1994 | Moseley | 188/71.5 |
| 5,509,507 A * | 4/1996 | Wells et al. | 188/71.5 |
| 5,551,534 A * | 9/1996 | Smithberger et al. | 188/71.5 |
| 5,769,185 A | 6/1998 | Main et al. | |
| 5,779,006 A | 7/1998 | Hyde et al. | |
| 5,992,577 A * | 11/1999 | Souetre | 188/71.5 |
| 6,340,075 B1 | 1/2002 | Bok et al. | |
| 7,104,366 B2 * | 9/2006 | McAfee et al. | 188/71.5 |
| 7,168,528 B1 * | 1/2007 | Bok et al. | 188/71.7 |
| 2002/0179382 A1 | 12/2002 | Fryska et al. | |
| 2004/0112687 A1 * | 6/2004 | McAfee et al. | 188/71.5 |
| 2005/0011706 A1 | 1/2005 | Johnson | |

* cited by examiner

*Primary Examiner* — Robert A Siconolfi
*Assistant Examiner* — Mariano Sy
(74) *Attorney, Agent, or Firm* — Shumaker & Sieffert, P.A.

(57) ABSTRACT

A method and brake disc assembly to utilize worn refurbished brake material is disclosed. The method discloses the use of a brake disc for braking and the subsequent machining or refurbishment of the brake disc so that the brake disc can be used for three tours of braking to increase the utilization of the brake material.

9 Claims, 2 Drawing Sheets

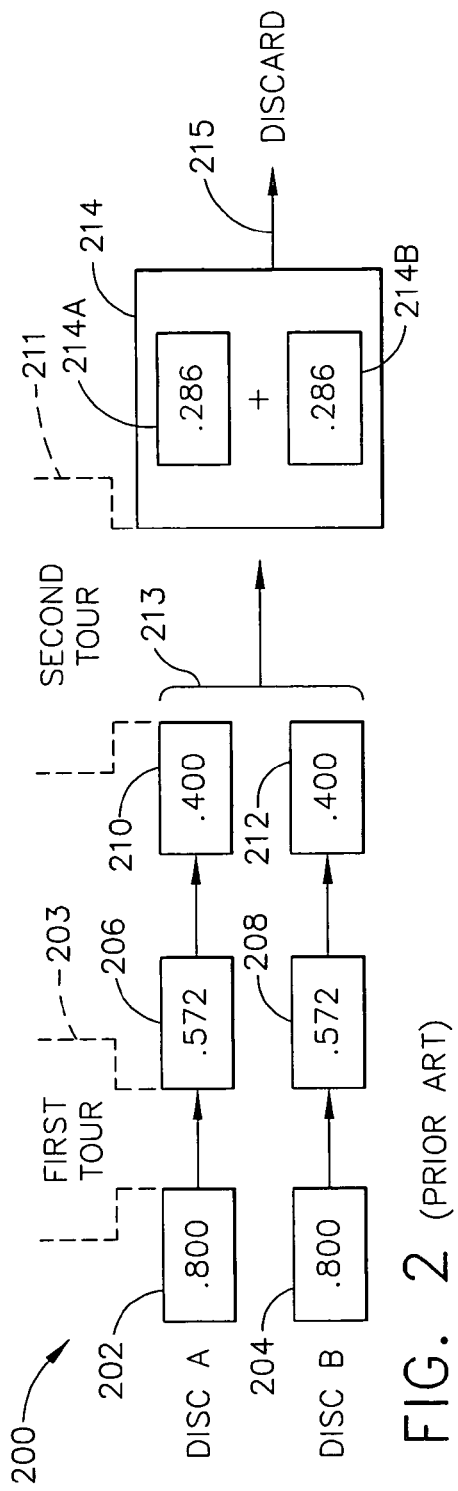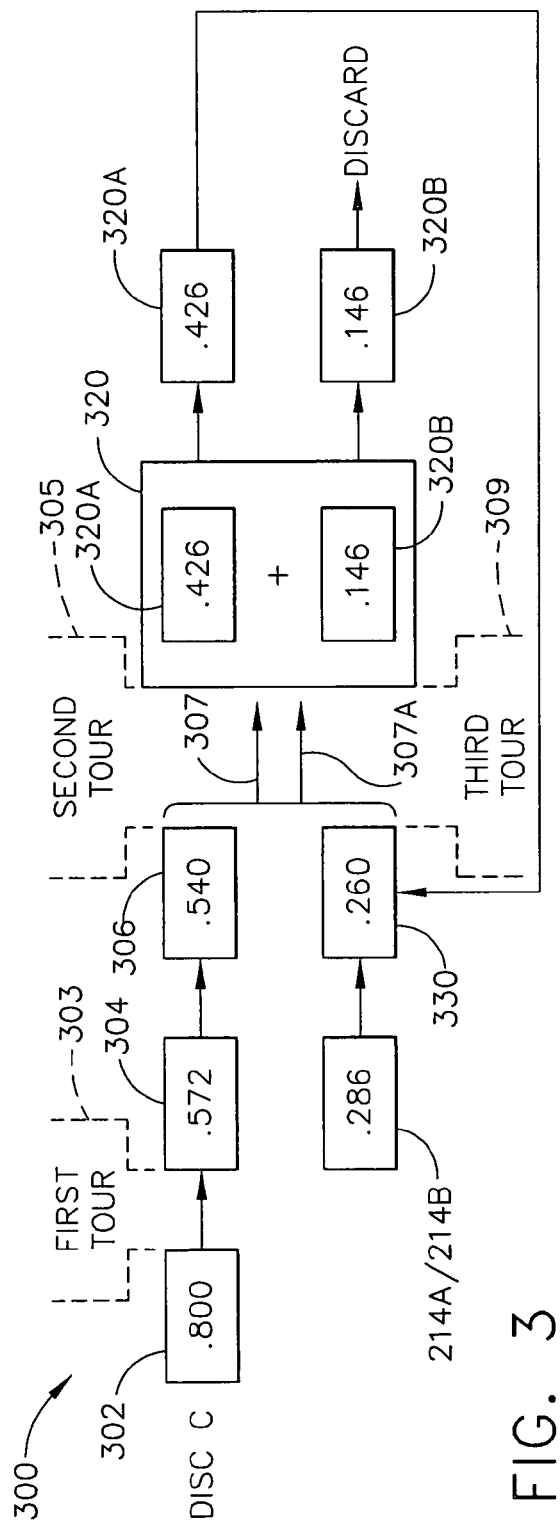

METHOD AND BRAKE DISC ASSEMBLY TO UTILIZE WORN REFURBISHED BRAKE MATERIAL

FIELD OF THE DISCLOSURE

This disclosure relates generally to a method and brake disc assembly to utilize worn refurbished brake material and, more particularly, to the utilization of worn refurbished carbon-carbon composite brake material.

BACKGROUND

The use of carbon-carbon composite brake discs in aircraft brakes, which have been referred to as carbon brakes, is well known in the aerospace industry. Carbon-carbon composite brake discs are manufactured by aircraft wheel and brake manufacturers using a variety of manufacturing methods, which generally require lengthy fabrication and densification methods. In recent years, aircraft manufacturers have increasingly specified the use of such carbon-carbon composite brake discs for brakes designed for use with new aircraft models. Typically, the greater the service life of carbon-carbon composite brake discs (e.g., the more service runs in which the brake discs can be utilized), the more the overall cost of utilizing carbon brakes in an aircraft is reduced. Therefore, it is highly desirable to use as much of the carbon-carbon composite material of a carbon-carbon composite brake disc before a worn brake disc must be discarded because its worn thickness is too thin to permit reuse.

BRIEF DESCRIPTION OF THE DRAWINGS

FIG. 2 is a representative flow diagram of a known 2-for-1 carbon-carbon composite brake disc refurbishment process.

FIG. 3 is a representative flow diagram of an example method to utilize worn refurbished brake material that enables a brake disc to be utilized for three brake service runs.

DETAILED DESCRIPTION

Figure 1:
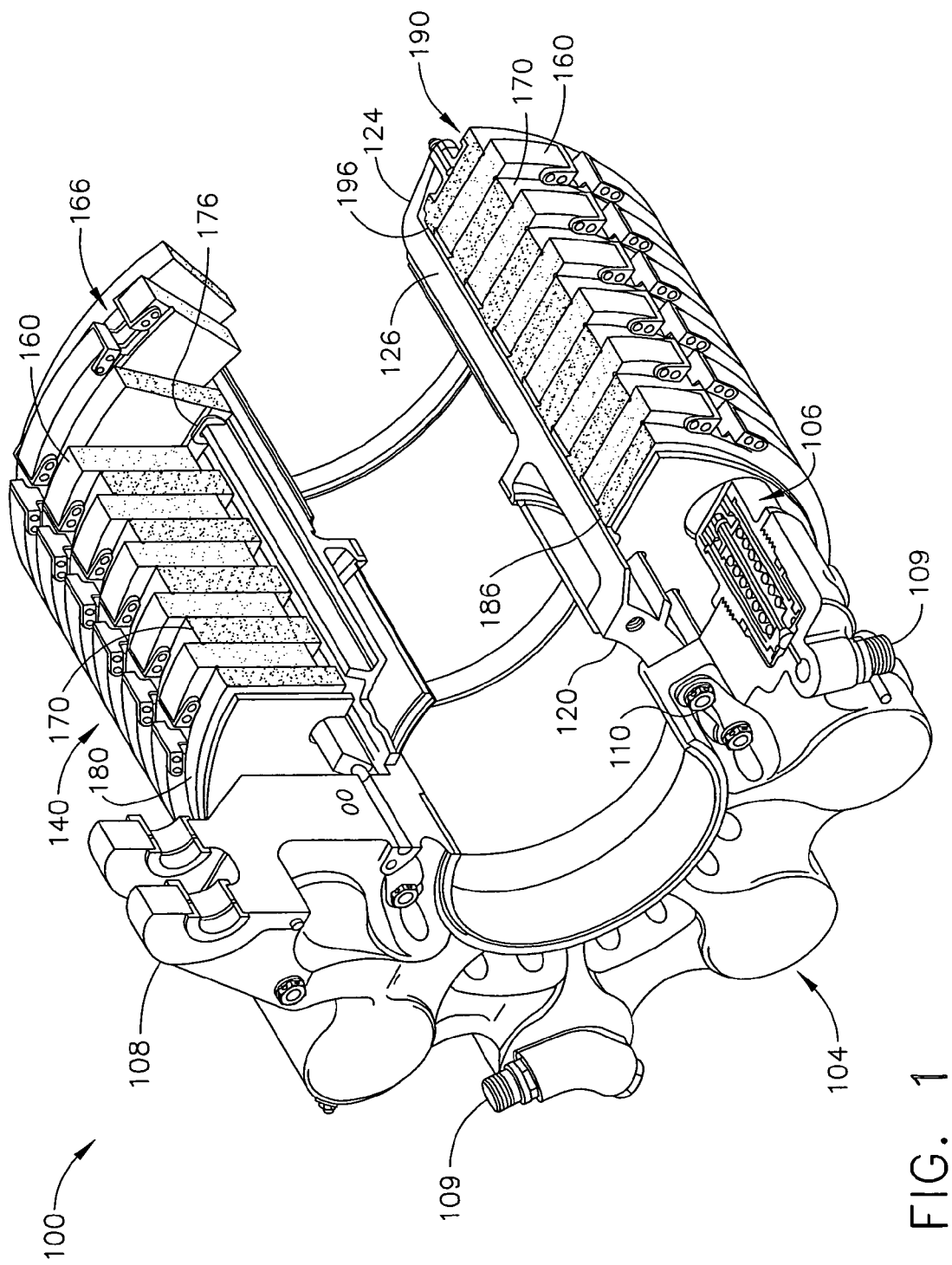
FIG. 1 is a cut-away perspective illustration of an example aircraft brake having a brake disc assembly with carbon-carbon composite brake discs.

In general, the example method and brake disc assembly to utilize worn refurbished brake material described herein may be applied to brake discs that are manufactured from various materials and by various manufacturing methods. Additionally, while the examples described herein are described in connection with aircraft applications in the aerospace industry, the examples described herein may be more generally applicable to a variety of braking applications in different industries.

FIG. 1 is a cut-away view of a typical aircraft brake 100 and, in particular, a brake having friction material components made of carbon-carbon composite material. The aircraft brake 100 includes a piston housing 104 having a plurality of hydraulic pistons 106 located about the circumference of the piston housing 104, hydraulic fittings 109 for communication with a hydraulic brake actuation system (not shown) of an aircraft (not shown), a torque take-out arm 108 for attachment to the landing gear (not shown) of the aircraft, and a plurality of circumferentially spaced bolts 110 attaching the piston housing 104 to a torque tube 120.

Torque tube 120 includes axially-extending splines 126 and extends horizontally from the piston housing 104 to a backing plate 124. Located about the torque tube 120 and between the pistons 106 and the backing plate 124, are a plurality of friction material discs constituting the heat stack or brake disc assembly 140 of the aircraft brake 100. The friction material discs of the brake disc assembly 140 include six rotor discs 160, five stator discs 170, a pressure plate disc 180, and a backing plate disc 190.

As is well known in the aircraft wheel and brake industry, the rotor discs 160 include a plurality of spaced-apart slots 166 in their outer circumference. The spaced-apart slots 166 receive drive keys (not shown) either attached to or made an integral part of the aircraft wheel (not shown) at a wheel well opening so that the rotor discs 160 are connected non-rotatably with the wheel. In a similar manner, the stator discs 170 include at their inner diameter a plurality of spaced-apart slots 176, the pressure plate disc 180 includes at its inner diameter a plurality spaced-apart slots 186, and the backing plate disc 190 includes at its inner diameter a plurality of spaced-apart slots 196. The spaced-apart slots 176, 186, and 196 receive the splines 126 of the torque tube 120 so that the stator discs 170, the pressure plate disc 180 and the backing plate disc 190 are attached non-rotatably to the torque tube 120.

In operation, the aircraft brake (the assembled piston housing 104, the torque tube 120, and the brake disc assembly 140) is mounted to an axle (not shown) of an aircraft landing gear (not shown), the torque take-out arm 108 is connected to the landing gear, and the piston housing 104 is connected via the fittings 109 to the hydraulic brake actuation system (not shown) of the aircraft. When an aircraft operator actuates a brake pedal of the aircraft or when the brakes are operated automatically by the aircraft's hydraulic brake actuation system, hydraulic brake fluid is pressurized to cause the hydraulic pistons 106 to extend from the piston housing 104 and squeeze together the spinning rotor discs 160 and the stationary stator discs 170 between the stationary pressure plate disc 180 and the stationary backing plate disc 190, thereby causing the spinning rotor discs 160 and attached wheel to decelerate and slow down the aircraft until it is brought to a stop. Persons of ordinary skill understand that the illustrated aircraft brake 100 can also be an electric aircraft brake that utilizes electromechanical actuators instead of the hydraulic pistons 106 and an electrical actuation system instead of the hydraulic brake actuation system, as is well known within the aircraft industry.

In the illustrated aircraft brake 100 of FIG. 1, the pressure plate disc 180, the rotor discs 160, the stator discs 170, and the backing plate disc 190 of the brake disc assembly 140 are made of carbon-carbon composite material. Repeated actuation of the aircraft brake 100 causes the brake disc assembly 140 to wear until the pressure plate disc 180, the rotor discs 160, the stator discs 170, and the backing plate disc 190 must be replaced with similar discs that have the thicknesses of unworn discs. In FIG. 1 for example, the rotor discs 160 and the stator discs 170 may have an initial, unused thickness of approximately 0.800 inch. Thus, the illustrated brake disc assembly 140 of the aircraft brake 100 comprises what is well known as a balanced brake disc assembly 140 (e.g., each rotor disc and stator disc has essentially the same thickness). When the rotor discs 160 and the stator discs 170 have been worn to a thickness of approximately 0.572 inch, the brake disc assembly 140 is removed from the aircraft brake 100 and replaced with an overhauled brake disc assembly wherein the rotor discs 160 and the stator discs 170 each have an unworn thickness of approximately 0.800 inch. Although not illustrated herein, a well-known brake disc assembly having rotor discs and stator discs with significantly different thicknesses is often called a thick-thin brake disc assembly. When the thin discs (rotor discs or stator discs) are worn to a thickness necessitating replacement, they are replaced at brake overhaul by new or refurbished thick discs, and the formerly thick discs (rotor discs or stator discs) remain in the overhauled brake disc assembly as worn thin discs and are used for another brake service run.

FIG. 2 illustrates a well-known method 200 of reworking or refurbishing worn carbon-carbon composite brake discs so that the refurbished discs may be used again for braking. The method of FIG. 2 enables more carbon-carbon composite material to be used before the brake discs must be discarded because their thicknesses are too small to permit further use for braking. The method 200 of FIG. 2 is commonly called a 2-for-1 refurbishment method. In FIG. 2, the new Disc A and the new Disc B are the same type of brake disc, either a stator disc or a rotor disc, and are used in a brake disc assembly of a brake (e.g., the brake disc assembly 140 of FIG. 1). The brake disc assembly may be either a balanced brake disc assembly having the stator and rotor discs with essentially the same thickness, or a thick-thin brake disc assembly having the rotor and stator discs with substantially different thicknesses. To illustrate the refurbishment process or method 200 of FIG. 2, both the new Disc A and the new Disc B have an initial thickness of about 0.800 inch (blocks 202 and 204) when usage in the brake begins. The use of the Discs A and B in the brake disc assembly of the brake for a service run or predetermined period of braking is commonly called a braking tour, and is indicated in FIG. 2 by First Tour 203. After the brake disc assembly of the brake has worn to a predetermined overall combined thickness for all of the rotors and stators (i.e., at the completion of the First Tour 203), the Disc A and the Disc B each have a worn thickness of about 0.572 inch (blocks 206 and 208) and are refurbished by machining each of the Discs A and B to a thickness of about 0.400 inch (blocks 210 and 212). The refurbished Discs A and B are then fastened together by either mechanical fasteners or by bonding of the Discs A and B to provide a Combined Disc 213 having a thickness of about 0.800 inch. The Combined Disc 213 may then be used in the brake for a Second Tour 211. After the brake disc assembly of the brake has again worn to the predetermined overall combined thickness for all of the rotors and stators (i.e., at the completion of the Second Tour 211), a resulting Worn Disc 215 includes a worn refurbished Disc A (block 214A) and a worn refurbished Disc B (block 214B) each having a worn thickness of about 0.286 inch (block 214). The individual worn refurbished Discs A and B (blocks 214A and 214B) of the Worn Disc 215 cannot be machined to a smaller thickness and reused in method 200 because such thinner discs may not, even when combined together, have sufficient structural strength, thermal capability, or dynamic stability to meet aircraft braking requirements. Thus, in FIG. 2 the worn refurbished Discs A and B (blocks 214A and 214B) of the Worn Disc 215 have to be discarded after only two tours of braking.

The amount of friction material of a brake disc, either the new Disc A or the new Disc B, used during the First Tour 203 and the Second Tour 211 of braking can be calculated by subtracting the worn disc thickness from the preceding new or refurbished disc thickness. For example, the new Disc A had a thickness of about 0.800 inch (block 202) and after the First Tour 203 of braking had a worn thickness of about 0.572 inch (block 206); resulting in 0.800−0.572=0.228 inch of friction material used during the First Tour 203 of braking for the new Disc A. The refurbished Disc A (block 210) had a refurbished disc thickness of about 0.400 inch and the worn refurbished Disc A (block 214A) had a thickness of about 0.286 inch; resulting in 0.400−0.286=0.114 inch of friction material used during the Second Tour 211 of braking. Thus, the total friction material of the Disc A used during the First Tour 203 and the Second Tour 211 of braking was about 0.342 inch; 0.228+0.114=0.342 inch.

FIG. 3 is a representative flow chart of an example method 300 for the utilization of a worn refurbished brake disc to extend the braking life of a brake disc and, in particular, a carbon-carbon composite brake disc. In the example method 300, the Disc C is a new or unworn brake disc having a first thickness of about 0.800 inch (block 302) when it is placed into a brake disc assembly of a brake (i.e., the brake disc assembly 140 and the brake 100 of FIG. 1) for a First Tour 303 of braking. After the brake disc assembly of the brake has worn to a predetermined overall combined thickness for the rotors and stators (i.e., at the completion of the First Tour 303), the worn Disc C has a first worn thickness of about 0.572 inch (block 304) and is refurbished by machining the worn Disc C to a first machined thickness of about 0.540 inch to produce a first refurbished disc (block 306). Because the material of a carbon-carbon composite brake disc is essentially a ceramic, the disc material typically is machined away by a cutting tool. However, as is well known by persons of ordinary skill in the art, other machining devices may be used. For example, a water jet cutter or a laser cutter, and all such cutting devices or their equivalents may be used to machine the disc material in the example method 300 of FIG. 3. The first refurbished disc of block 306 is then combined with a twice refurbished disc (block 330) to provide a first combination of discs 307 having an overall or combined thickness of about 0.800 inch (0.540+0.260) required for braking use.

The twice refurbished disc (block 330) may be machined from discs available from: either a disc that is a product (block 320A) of the example method 300 of FIG. 3 (as disclosed below) or a worn refurbished disc from the previously described 2-for-1 method 200 illustrated in FIG. 2, which produces the worn refurbished discs of block 214A and 214B. As will be described below for the example method 300 of FIG. 3, a worn first refurbished disc (block 320A of block 320) having a second worn thickness of about 0.426 inch may be machined to a second machined thickness of about 0.260 inch to produce the second refurbished disc (block 330) for combination with the first refurbished disc of block 306. Together the first refurbished disc (block 306) and the twice refurbished disc (block 330) have a combined thickness of about 0.800 inch to produce the first combination of discs 307. The first combination of discs 307 is then placed in a brake disc assembly of the brake (i.e., the brake disc assembly 140 of the brake 100) for a second service run of braking (a Second Tour 305).

After the brake disc assembly of the brake has worn to a predetermined overall combined thickness for all of the rotors and stators (i.e., at the completion of the Second Tour 305), the worn first combination of discs 307 includes a worn first refurbished disc (block 320A) having a worn thickness of about 0.426 inch and a worn second refurbished disc (block 320B) having a worn thickness of about 0.146 inch. Because the worn twice refurbished disc (block 320B) is too thin to be machined or refurbished to a usable thickness, it is discarded. The worn first refurbished disc (block 320A) has a worn thickness of about 0.426 inch that is then machined to a thickness of about 0.260 inch to provide a twice refurbished disc (block 330) for combination with a first refurbished disc (block 306) to produce a second combination of discs 307A having a combined thickness of about 0.800 inch. Thus, the twice refurbished disc of block 330 is part of the second combination of discs 307A placed in the brake disc assembly of the brake for braking. As a result, the twice refurbished disc of Block 330 is utilized for its Third Tour 309 of braking, which also constitutes the Second Tour 305 of braking for the first refurbished disc (block 306) of the second combination of discs 307A.

Alternatively, if a worn first refurbished disc (block 320A) is not available, then a new disc having a thickness of about 0.260 inch, or a disc having a thickness greater than 0.260 inch that is then machined to the thickness of about 0.260 inch can be used to provide a substitute disc for block 330 of method the example 300.

After the brake disc assembly of the brake has worn to a predetermined overall combined thickness for the rotors and stators (i.e., the completion of the Third Tour 309 of braking for the twice refurbished disc of the block 330 and the Second Tour 305 of braking for the first refurbished disc of block 306), the worn second combination of discs 307A includes a worn first refurbished disc (block 320A) having a worn thickness of about 0.426 inch and a worn second refurbished disc (block 320B) having a worn thickness of about 0.146 inch. Because the worn second refurbished disc (block 320B) is too thin to be machined or refurbished to a usable thickness, it is discarded, and the worn first refurbished disc (block 320A) is machined to the second machined thickness to produce a twice refurbished disc (block 330) for use in its Third Tour 309 of braking as part of a second combination of discs 307A which includes the first refurbished disc of block 306.

In the example method 300 of FIG. 3, the amount of the friction material of the Disc C used during the three tours of braking can be calculated by subtracting a worn disc thickness from the preceding new or refurbished disc thickness. For example, the new Disc C had a thickness of 0.800 inch (block 302) and after the First Tour 303 of braking had a first worn thickness of about 0.572 inch (Block 304), resulting in 0.800−0.572=0.228 inch of friction material used during the First Tour 303 of braking. The worn Disc C was then machined to a first refurbished thickness of about 0.540 inch (block 306) before it was combined with the twice refurbished disc of block 330 to produce the first combination of discs 307 used in the Second Tour 305 of braking. After completion of the Second Tour 305, the worn first refurbished disc (block 320A) had a second worn thickness of about 0.426 inch, resulting in 0.540−0.426=0.114 inch of friction material used during the Second Tour 305 of braking. The worn first refurbished disc (block 320A) was then machined to a second machined thickness of about 0.260 inch to produce the twice refurbished disc of block 330. The twice refurbished disc of block 330 was then combined with another first refurbished disc of block 306 to produce the second combination of discs 307A for use in the Third Tour 309 of braking. After the completion of its Third Tour 309 of braking, the worn second refurbished disc of block 320B had a worn thickness of about 0.146 inch, resulting in 0.260−0.146=0.114 inch of friction material used during the Third Tour 309 of braking for the Disc C. Thus, the total friction material of the Disc C used during the three Tours (the First Tour 303, the Second Tour 305, and the Third Tour 309) of braking was 0.456 inch (i.e., 0.228+0.114+0.114=0.456 inch). In this manner, the example method 300 of FIG. 3 provides the utilization of 0.456 inch of friction material of a brake disc for three tours of braking as compared to the utilization of 0.342 inch of friction material of a brake disc for two tours of braking in the 2-for-1 method 200 of FIG. 2. As can be seen from the foregoing, the example method 300 enables an additional 0.114 inch of friction material (i.e., an increase of 33.3%) to be utilized.

It is economically desirable to increase the utilization of the friction material of carbon-carbon composite brake discs, and an increase of 33.3% in the utilization of carbon-carbon composite friction material for braking is a significant improvement that can contribute significantly to reducing an aircraft operator's cost of operating an aircraft equipped with brakes having carbon-carbon composite brake discs. Although the example method in FIG. 3 can be used with either a balanced brake disc assembly or a thick-thin brake disc assembly, a balanced brake disc assembly can have overall fewer parts numbers than the overall part numbers used with a thick-thin brake disc assembly, which can reduce the number of parts to be tracked by an aircraft operator. In addition, the reuse of the refurbished brake discs in the same type of balanced brake disc assembly minimizes any effects upon the thermal balance of the brake disc assembly.

An example method and brake disc assembly are described with reference to the flowchart illustrated in FIG. 3. However, persons of ordinary skill in the art will readily appreciate that other methods of implementing the example method may alternatively be used. For example, the order of execution of the blocks may be changed, and/or some of the blocks described may be changed, eliminated, or combined.

Although certain example methods and apparatus have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method to utilize a brake disc for braking wherein the brake disc is one of a group of rotor discs and a group of stator discs, the method comprising:

using a brake disc having a first thickness for braking to provide a worn disc having a first worn thickness;

machining the worn disc to a first machined thickness to provide an once refurbished disc;

combining the once refurbished disc with a twice refurbished disc by a fastening element to provide a first combination of discs having a first combined thickness substantially the same as the first thickness;

using the first combination of discs for braking to provide a worn first combination of discs including a worn once refurbished disc having a second worn thickness;

machining the worn first refurbished disc to a second machined thickness to provide another twice refurbished disc;

combining the other twice refurbished disc with another once refurbished disc by a fastening element to provide a second combination of discs having substantially the first thickness; and using the second combination of discs for braking to provide a worn second combination of discs, wherein each fastening element allows the combined discs to have substantially the same thickness as the brake disc having the first thickness so that any one of the combined discs can replace any one of the group of rotor discs and the group of stator discs, and each of the group of rotor discs has substantially the same thickness and each of the group of stator discs has substantially the same thickness in a braking tour.

2. The method as claimed in claim 1, wherein the worn first combination of discs has a first worn combined thickness and the worn second combination of discs has a second worn combined thickness substantially equal to the first worn combined thickness.

3. The method as claimed in claim 1, wherein the twice refurbished disc comprises at least one of a machined worn refurbished disc and the other twice refurbished disc.

4. The method as claimed in claim 3, further comprising discarding the machined worn refurbished disc of the worn first combination of discs.

5. The method as claimed in claim 3, wherein the machined worn refurbished disc is one of two initial discs each initially having the first thickness and used for braking to provide a worn initial disc, each worn initial disc machined to an initial machined thickness to provide a refurbished initial disc, the refurbished initial discs combined to provide an initial combination of discs having substantially the first thickness and used for braking to provide a worn initial combination of discs including worn refurbished initial discs, and at least one of the worn refurbished initial discs machined to the second machined thickness to provide the worn refurbished disc.

6. The method as claimed in claim 1, further comprising discarding the other twice refurbished disc of the worn second combination of discs.

7. The method as claimed in claim 1, wherein the braking is provided by an aircraft brake.

8. The method as claimed in claim 7, wherein the aircraft brake has a balanced brake disc assembly.

9. The method as claimed in claim 7, wherein the aircraft brake has a thick-thin brake disc assembly.

* * * * *